US011384265B2

(12) United States Patent
Noh et al.

(10) Patent No.: US 11,384,265 B2
(45) Date of Patent: Jul. 12, 2022

(54) PRESSURE-SENSITIVE ADHESIVE COMPOSITION, POLARIZING PLATE, AND OPTICAL MEMBER

(71) Applicant: SHANJIN OPTOELECTRONICS (SUZHOU) CO., LTD., Zhangjiagang (CN)

(72) Inventors: Seung Ju Noh, Daejeon (KR); Ha Song Yun, Daejeon (KR); Woo Yeon Kim, Daejeon (KR); Hyun Hee Son, Daejeon (KR); Jang Soon Kim, Daejeon (KR); Kwang Su Seo, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 11 days.

(21) Appl. No.: 16/647,232

(22) PCT Filed: Sep. 13, 2018

(86) PCT No.: PCT/KR2018/010771
§ 371 (c)(1),
(2) Date: Mar. 13, 2020

(87) PCT Pub. No.: WO2019/054778
PCT Pub. Date: Mar. 21, 2019

(65) Prior Publication Data
US 2020/0216725 A1    Jul. 9, 2020

(30) Foreign Application Priority Data

Sep. 15, 2017  (KR) .................. 10-2017-0118726
Sep. 10, 2018  (KR) .................. 10-2018-0107807

(51) Int. Cl.
C09J 133/06    (2006.01)
C09J 133/08    (2006.01)
G02B 5/30      (2006.01)
C09J 133/10    (2006.01)
G02F 1/1335    (2006.01)

(52) U.S. Cl.
CPC ........... *C09J 133/06* (2013.01); *C09J 133/08* (2013.01); *C09J 133/10* (2013.01); *G02B 5/305* (2013.01); *C09J 2203/318* (2013.01); *C09K 2323/057* (2020.08); *G02F 1/133528* (2013.01)

(58) Field of Classification Search
CPC ...... C09J 133/06; C09J 133/08; C09J 133/10; C09J 133/066; C09J 133/26; C09J 2301/312; C09J 2301/318; G02B 5/305; G02F 1/133528; G02F 2202/22; G02F 2202/28; C09K 2323/057
See application file for complete search history.

(56) References Cited

U.S. PATENT DOCUMENTS

| | | | |
|---|---|---|---|
| 2007/0148485 A1 | 6/2007 | Kusama et al. | |
| 2011/0234948 A1* | 9/2011 | Yoon | C09J 133/066 349/96 |
| 2012/0321819 A1* | 12/2012 | Kim | G02B 1/14 428/1.1 |
| 2013/0083013 A1* | 4/2013 | Jeon | G06T 15/00 345/419 |
| 2014/0093662 A1* | 4/2014 | Kim | G02F 1/133528 428/1.53 |
| 2014/0349100 A1* | 11/2014 | Niimi | C09J 7/10 428/220 |
| 2015/0062503 A1* | 3/2015 | Yoon | C09J 7/387 349/96 |
| 2017/0349791 A1 | 12/2017 | Lee et al. | |
| 2017/0355889 A1* | 12/2017 | Kim | G01B 5/30 |

FOREIGN PATENT DOCUMENTS

| | | | | |
|---|---|---|---|---|
| JP | 2005043795 A | | 2/2005 | |
| JP | 2007169329 A | * | 7/2007 | |
| JP | 2007169329 A | | 7/2007 | |
| JP | 2010044376 A | | 2/2010 | |
| JP | 2011093957 A | | 5/2011 | |
| KR | 20110007687 A | | 1/2011 | |
| KR | 20110029761 A | | 3/2011 | |
| KR | 101171976 B1 | * | 8/2012 | |
| KR | 20120109750 A | | 10/2012 | |
| KR | 20160074425 A | | 6/2016 | |
| KR | 20170085095 A | | 7/2017 | |
| KR | 102159496 B1 | * | 3/2019 | |
| TW | 200732446 A | | 9/2007 | |
| TW | 201634621 A | | 10/2016 | |
| TW | I706022 B | * | 10/2020 | |
| WO | 2016099187 A1 | | 6/2016 | |
| WO | 2016104979 A1 | | 6/2016 | |
| WO | WO-2016099187 A1 | * | 6/2016 | G02B 5/3033 |

OTHER PUBLICATIONS

Search Report from Office Action for Taiwanese Application No. 107132538 dated Oct. 7, 2019.
International Search Report for PCT/KR2018/010771 dated Dec. 21, 2018.

* cited by examiner

*Primary Examiner* — Sophie Hon
(74) *Attorney, Agent, or Firm* — Schmeiser, Olsen & Watts, LLP

(57) ABSTRACT

The present application relates to a photocurable solventless pressure-sensitive adhesive composition, a pressure-sensitive adhesive polarizing plate and a display device. According to the present application, a pressure-sensitive adhesive composition, a polarizing plate and a liquid crystal device, which have excellent durability and antistatic abilities, can be provided.

15 Claims, No Drawings

PRESSURE-SENSITIVE ADHESIVE COMPOSITION, POLARIZING PLATE, AND OPTICAL MEMBER

TECHNICAL FIELD

Cross-Reference to Related Applications

The present application is a national phase entry under 35 U.S.C. § 371 of International Application No. PCT/KR2018/010771 filed Sep. 13, 2018, which claims priority from Korean Patent Application No. 10-2017-0118726 filed Sep. 15, 2017 and Korean Patent Application No. 10-2018-0107807 filed Sep. 10, 2018, all of which are incorporated herein by reference.

Background Art

The present application relates to a pressure-sensitive adhesive composition, a polarizing plate and an optical member.

BACKGROUND ART

A pressure-sensitive adhesive has very various applications. For example, upon manufacturing a liquid crystal display device (hereinafter, referred to as "LCD device") comprising an optical functional film, such as a polarizing film, a retardation film or a brightness enhancement film, and a liquid crystal panel, a pressure-sensitive adhesive may be used for lamination between optical functional films or attachment of the optical functional film to the liquid crystal panel.

When the pressure-sensitive adhesive is used for the application, there may be a case where the pressure-sensitive adhesive is transferred from a release base material, or the pressure-sensitive adhesive is attached to an object to be bonded or peeled for reuse therefrom. The static electricity generated in this process may cause malfunction of the device.

On the other hand, the pressure-sensitive adhesive is produced by a method of drying a solvent in a pressure-sensitive adhesive composition applied on a release base material, and then transferring the adhesive, where there are problems that bubbles may be generated or unevenness of the pressure-sensitive adhesive layer thickness or the like may occur in this process.

DISCLOSURE

Technical Problem

It is one object of the present application to provide a solventless pressure-sensitive adhesive composition which can provide a uniform thickness upon forming a pressure-sensitive adhesive layer and has excellent durability such as suppression of bubble generation.

It is another object of the present application to provide a solventless pressure-sensitive adhesive composition capable of preventing generation of static electricity due to low surface resistance upon forming a pressure-sensitive adhesive layer.

The above objects and other objects of the present application can be all attained by the present application which is described in detail below.

Technical Solution

In one example of the present application, the present application relates to a pressure-sensitive adhesive polarizing plate. The polarizing plate may comprise a polarizing film and a pressure-sensitive adhesive layer formed on at least one side of the polarizing film.

The pressure-sensitive adhesive layer may be formed by photo-curing a solventless composition to be described below. That is, the pressure-sensitive adhesive layer may be a cured product of a solventless photo-curable composition. The photo-curing can be accomplished, for example, by irradiation with electromagnetic waves such as microwaves, infrared rays (IR), ultraviolet rays (UV), X-rays or gamma rays as well as particle beams such as alpha-particle beams, proton beams, neutron beams and electron beams. The condition for photo-curing the composition is not particularly limited.

The polarizing film may be a functional film capable of extracting only light vibrating in one direction from incident light with vibrating in various directions. The kind of the usable polarizing film is not particularly limited. For example, a general polarizing film known in this field, such as a polyvinyl alcohol-based polarizing film in which a dichroic dye is adsorbed and oriented on a polyvinyl alcohol-based film, can be used without limitation. The polyvinyl alcohol-based resin used for the polarizing film can be obtained by, for example, gelling a polyvinyl acetate-based resin. In this case, in the usable polyvinyl acetate-based resin, not only a homopolymer of vinyl acetate but also a copolymer of vinyl acetate and other monomers copolymerizable therewith may be included. Here, an example of the monomer copolymerizable with vinyl acetate may include one or a mixture of two or more of unsaturated carboxylic acids, olefins, vinyl ethers, unsaturated sulfonic acids and acrylamides having an ammonium group, and the like, but is not limited thereto. The polyvinyl alcohol-based resin may have a gelation degree of usually about 85 mol % to 100 mol %, and preferably 98 mol % or more. The polyvinyl alcohol-based resin may also be further modified, and for example, polyvinyl formal or polyvinyl acetal modified with aldehydes may be used. In addition, the polyvinyl alcohol-based resin may have a polymerization degree of usually 1,000 to 10,000 or so, and preferably 1,500 to 5,000 or so.

The polarizing film may be produced through a process of stretching the polyvinyl alcohol-based resin film (e.g., uni-axially stretching), a process of dyeing the polyvinyl alcohol-based resin film with a dichroic dye and adsorbing the dichroic dye, a process of treating the dichroic dye-adsorbed polyvinyl alcohol-based resin film with an aqueous solution of boric acid and a process of water washing after treatment with the aqueous solution of boric acid, and the like. Here, as the dichroic dye, iodine or a dichroic organic dye, and the like may be used.

The method of forming the pressure-sensitive adhesive layer on the optical member such as the polarizing film is not particularly limited. For example, a method of applying a pressure-sensitive adhesive composition for forming a pressure-sensitive adhesive layer as mentioned below using a bar coater or the like and then curing it, or applying the pressure-sensitive adhesive composition on a surface of a peelable base material (release base material) and curing it, and then transferring it on a polarizing film, and the like can be used. The composition of the present application is more suitable for the latter method in that the generation of static electricity can be suppressed when the release base material is removed.

The pressure-sensitive adhesive layer may be a photo-cured product of a solventless composition. That is, the composition used to form the pressure-sensitive adhesive layer is a solventless type, which may be a composition comprising a photocurable component. In the present application, the term "solventless composition" means that the composition does not contain a solvent, for example, an organic solvent or an aqueous solvent, and the like. In the present application, the term "photocuring composition" means a composition which can be cured by radical polymerization according to light irradiation. For example, the photocuring composition may comprise a resin having a carbon-carbon unsaturated double bond in the molecule so that polymerization can be performed by a radical reaction according to light irradiation.

In the case of using the solventless composition, the drying process for the solvent can be omitted, so that the process efficiency can be enhanced, and generation of bubbles due to the solvent and the problem of durability deterioration of the pressure-sensitive adhesive polarizing plate due to that can be avoided. Also, the solventless photocurable composition is advantageous in securing adhesive force. Then, in a thermosetting composition such as an isocyanate reactive composition, a separate aging step is necessary for stabilizing physical properties after curing, but the photocuring composition has an advantage that it can be commercialized immediately after curing without aging. In addition, the use of the solventless photocurable composition has an advantage that shrinkage or a deterioration problem of the polarizer, which occurs upon thermal curing, can be avoided.

In this connection, the solventless photocurable composition of the present application may comprise two or more photocurable resins (or polymers) having different molecular weights and having carbon-carbon unsaturated double bonds in each molecule.

Specifically, the composition may further comprise a first resin having a weight average molecular weight (Mw) in a range of 1,000,000 to 3,500,000, and a second resin having a weight average molecular weight lower than that of the first resin. In the present application, the weight average molecular weight may mean a value converted for standard polystyrene as measured by GPC (gel permeation chromatograph), as described in Examples as described below.

Since the second resin having a relatively small molecular weight has excellent dispersibility as compared to the first resin, it may be present in a state of being appropriately dispersed in the composition containing the second resin and/or the cured product thereof. Due to such characteristics of the second resin, migration of an antistatic agent onto the surface of the pressure-sensitive adhesive layer can be facilitated, and accordingly, even with a small amount of the antistatic agent, the effect of reducing the surface resistance of the pressure-sensitive adhesive layer can be greatly improved.

In one example, the second resin may comprise polymerized units derived from a (meth)acrylic acid ester monomer and a monomer represented by Formula 1 below. In the present application, the term "polymerized unit" may mean a state where in a main chain or side chain, and the like of a resin, a polymer or a polymerized reaction product that one or more predetermined monomers are polymerized and formed, the predetermined monomers are polymerized and included.

[Formula 1]

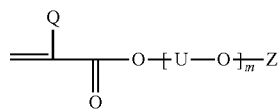

In Formula 1 above, Q is hydrogen or an alkyl group, U is alkylene having 1 to 4 carbon atoms, m is a number in a range of 1 to 15, and Z is hydrogen, an alkyl group or an aryl group. Also, when two or more [—U—O—] units are present in Formula 1, the carbon numbers of U in the units may be the same or different.

In Formula 1 above, m is any number, which may be, for example, a number in a range of 1 to 15, in a range of 1 to 13, or in a range of 1 to 11. When the above range is satisfied, appropriate conductivity can be imparted to the pressure-sensitive adhesive.

In the present application, the term alkyl group may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic. The alkyl group may be substituted by one or more substituents, or may be in an unsubstituted state.

In this specification, the term alkylene group may be an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be linear, branched or cyclic. The alkylene group may be substituted by one or more substituents, if necessary.

In the present application, the term aryl group may mean a monovalent residue derived from a compound comprising a structure that a benzene ring is included or two or more benzene rings are connected, or two or more benzene rings are condensed or bonded while sharing one or two or more carbon atoms, or a derivative thereof, unless otherwise specified. The aryl group may be, for example, an aryl group having 6 to 25 carbon atoms, 6 to 22 carbon atoms, 6 to 16 carbon atoms or 6 to 13 carbon atoms. Such an aryl group can be exemplified by a phenyl group, a phenylethyl group, a phenylpropyl group, a benzyl group, a tolyl group, a xylyl group or a naphthyl group, and the like.

The compound of Formula 1 may include, for example, ethoxyethoxyethyl (meth)acrylate, alkoxydialkylene glycol (meth)acrylic acid ester, alkoxytrialkylene glycol (meth) acrylic acid ester, alkoxytetraalkylene glycol (meth)acrylic acid ester, aryloxydialkylene glycol (meth)acrylic acid ester, aryloxytrialkylene glycol (meth)acrylic acid ester, aryloxytetraalkylene glycol (meth)acrylic acid ester or polyalkylene glycol monoalkyl ether (meth)acrylic acid ester, and the like, but is not limited thereto.

The kind of the (meth)acrylic acid ester monomer contained in the second resin is not particularly limited. For example, as the (meth)acrylic acid ester monomer, alkyl (meth)acrylate having 1 to 20 carbon atoms, 1 to 16 carbon atoms, 1 to 12 carbon atoms, 1 to 8 carbon atoms or 1 to 4 carbon atoms may be used. As an example of such a monomer, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth) acrylate or lauryl (meth)acrylate, and the like may be used, but is not limited to only the listed monomers.

In one example, the second resin may comprise polymerized units of 50 to 90 parts by weight of a (meth)acrylic acid ester monomer and polymerized units of 10 to 50 parts by weight of a monomer represented by Formula 1 above. If the amount of the monomer represented by Formula 1 is less than 10 parts by weight, the antistatic effect is insignificantly improved, and if the amount exceeds 50 parts by weight, compatibility with the first resin becomes poor, so that phase separation may occur between the resins. In the present application, the "part by weight" may mean a relative weight ratio between the respective components. For example, when the second resin is formed from a mixture of the (meth)acrylic acid ester monomer and the monomer represented by Formula 1 above, the relative weight ratio of the two monomers in the mixture may be 50 parts by weight to 90 parts by weight of the (meth)acrylic ester monomer: 10 to 50 parts by weight of the monomer represented by Formula 1 above.

In one example, in the case of satisfying the above content range, upon forming the second resin, the monomer represented by Formula 1 above may be used in an amount of 15 parts by weight or more, 20 parts by weight or more, 25 parts by weight or more, 30 parts by weight or more, 35 parts by weight or more, 40 parts by weight or more, or 45 parts by weight or more.

In one example, the second resin may have a weight average molecular weight of less than 1,000,000. When the second resin has a molecular weight within the above range, the antistatic function of the pressure-sensitive adhesive composition can be further improved because it functions as a kind of plasticizer. More specifically, the molecular weight of the second resin may be 950,000 or less, 900,000 or less, 850,000 or less, 800,000 or less, 750,000 or less, 700,000 or less, 650,000 or less, 600,000 or less, 550,000 or less, 500,000 or less, 450,000 or less, or 400,000 or less. Considering the function as a plasticizer, it is more preferred that it is 800,000 or less. The lower limit of the molecular weight of the second resin may be 50,000 or more, 100,000 or more, 150,000 or more, 200,000 or more, or 250,000 or more. If the molecular weight of the second resin is less than 50,000, the cohesive force of the pressure-sensitive adhesive film may remarkably decrease and the durability may be poor.

In one example, the composition may comprise 40 parts by weight to 95 parts by weight of the first resin and 5 parts by weight to 60 parts by weight of the second resin. When the amount of the second resin is less than 5 parts by weight, it is difficult to obtain a desired level of antistatic performance, and when the amount of the second resin is more than 60 parts by weight, the properties of the first resin are greatly impaired, so that the durability may be poor.

In consideration of the endurance reliability of the pressure-sensitive adhesive, it is preferred that in the relative content of the first resin and the second resin, the content of the first resin having a large molecular weight is equal to or more than the content of the second resin. For example, the composition may comprise 50 parts by weight to 95 parts by weight of the first resin and 5 parts by weight to 50 parts by weight of the second resin.

In one example, the first resin may comprise polymerized units derived from a (meth)acrylic acid ester monomer. For example, the first resin may be a polymer of a (meth)acrylic acid ester monomer or a mixture thereof. As the (meth)acrylic acid ester monomer, one or more of monomers mentioned in relation to the second resin may be used.

In another example, the first resin may further comprise polymerized units of a compound capable of hydrogen bonding. When the first resin has polymerized units of a compound capable of hydrogen bonding, adhesion of the pressure-sensitive adhesive layer or durability of the pressure-sensitive adhesive layer can be improved through hydrogen bonding. The type of the compound capable of hydrogen bonding is not particularly limited, and for example, one or more of compounds including a hydroxyl group, a carboxyl group, a urethane group, an amine group or an amide group may be used.

In one example, the compound capable of hydrogen bonding may be hydroxyalkyl (meth)acrylates such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate; poly(alkylene glycol) (meth)acrylates such as poly(ethylene glycol) (meth)acrylate or poly(propylene glycol) (meth)acrylate; carboxyl group-containing copolymerizable monomers such as (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid or maleic anhydride; or amide group-containing monomers such as (meth)acrylamide or N,N-dimethyl (meth)acrylamide, N,N-diethyl (meth)acrylamide, N-isopropyl (meth)acrylamide, N-methylol (meth)acrylamide, diacetone (meth)acrylamide, N-vinylacetoamide, N,N'-methylenebis (meth)acrylamide, N,N-dimethylaminopropyl (meth)acrylamide, N,N-dimethylaminopropylmethacrylamide, N-vinylpyrrolidone, N-vinylcaprolactam or (meth)acryloylmorpholine, and the like, but is not limited thereto.

In one example, when the first resin comprises a compound capable of hydrogen bonding as polymerized units, the first resin may comprise polymerized units of 30 parts by weight or less of the compound capable of hydrogen bonding. For example, the first resin may comprise polymerized units of 70 parts by weight or more of a (meth)acrylic acid ester monomer and polymerized units of 30 parts by weight or less of a compound capable of hydrogen bonding. If the content of the compound capable of hydrogen bonding exceeds 30 parts by weight, the attractive force in the compound capable of hydrogen bonding acts more than the attractive force with the surface of the attached base material, so that pressure-sensitive adhesive properties may be deteriorated. More specifically, within the range satisfying the content range, the content of the compound capable of hydrogen bonding that can be used upon forming the first resin may be 25 parts by weight or less, 20 parts by weight or less, 15 parts by weight or less, or 10 parts by weight or less. Then, the lower limit may be 1 part by weight or more, 2 parts by weight or more, 3 parts by weight or more, 4 parts by weight or more, 5 parts by weight or more, 6 parts by weight or more, 7 parts by weight or more, 8 parts by weight or more, 9 parts by weight or more, or 10 parts by weight or more.

In one example, the pressure-sensitive adhesive composition may comprise a multifunctional (meth)acrylate. If the compound has two or more (meth)acryloyl groups in the molecule, the specific type of the multifunctional (meth)acrylate contained in the composition is not particularly limited. In one example, bifunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxylpuivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecanedimethanol (meth)acrylate, dimethylol dicyclopentane di(meth)acrylate, ethylene oxide modified hexahydrophthalic acid di(meth)acrylate, tricyclodecanedimethanol (meth)acrylate, neopentyl glycol modified trimethylpropane di(meth)acrylate, adamantane di(meth)acrylate or 9,9-bis[4-(2-acryloyloxyethoxy)phenyl]fluorine; trifunctional acrylates such as trimethylolpropane tri(meth)acrylate, dipentaerythritol tri(meth)acrylate, propionic acid modified dipentaerythritol tri(meth)acrylate, pentaerythritol tri(meth)

acrylate, propylene oxide modified trimethylolpropane tri(meth)acrylate, trifunctional urethane (meth)acrylate or tris(meth)acryloxyethylisocyanurate; tetrafunctional acrylates such as diglycerin tetra(meth)acrylate or pentaerythritol tetra(meth)acrylate; pentafunctional acrylates such as propionic acid modified dipentaerythritol penta(meth)acrylate; and hexafunctional acrylates such as dipentaerythritol hexa(meth)acrylate, caprolactone modified dipentaerythritol hexa(meth)acrylate or urethane (meth)acrylate (for example, a reactant of an isocyanate monomer and trimethylolpropane tri (meth)acrylate), and the like may be used. The multifunctional (meth)acrylate may be used in an amount of 5 parts by weight or less relative to 100 parts by weight of the total content of the first resin and the second resin. For example, the multifunctional (meth)acrylate may be used in a range of 0.001 or more, 0.01 or more, or 0.1 or more, and in a range of 3 parts by weight or less, or 2 parts by weight or less.

In one example, the composition may further comprise a photocuring oligomer. For example, as the photocuring oligomer, urethane acrylate obtained by reacting a polyol and a polyisocyanate compound may be used. The oligomer may have a weight average molecular weight (Mw) in a range of 1,000 to 50,000, as measured by GPC and converted on the basis of polystyrene. Although not particularly limited, the second crosslinking agent may be a bifunctional urethane acrylate oligomer having two acrylate groups at the terminals thereof. The photocuring oligomer may be used in an amount of 15 parts by weight or less relative to 100 parts by weight of the total content of the first resin and the second resin. For example, it may be used in a content of 0.01 or more, 0.1 or more, 0.5 or more, or 1.0 or more, and in a content of 10 parts by weight or less, or 5 parts by weight or less.

The pressure-sensitive adhesive composition may further comprise a photoinitiator. As the photoinitiator, a known compound may be used. For example, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, or phenylbis(2,4,6-trimethylbenzoyl)-phosphine oxide, and the like may be used as a radical initiator In another example, a commercialized photoinitiator product may be used, and for example, an alpha-hydroxyketone-based compound (for example, IRGACURE 184, IRGACURE 500, IRGACURE 2959, DAROCUR 1173; manufactured by Ciba Specialty Chemicals); a phenylglyoxylate-based compound (for example, IRGACURE 754, DAROCUR MBF; manufactured by Ciba Specialty Chemicals); a benzyldimethylketal-based compound (for example, IRGACURE 651; manufactured by Ciba Specialty Chemicals); an a-aminoketone-based compound (for example, IRGACURE 369, IRGACURE 907, IRGACURE 1300; manufactured by Ciba Specialty Chemicals); a monoacylphosphine-based compound (MAPO) (for example, DAROCUR TPO; manufactured by Ciba Specialty Chemicals); a bisacylphosphine compound (BAPO) (for example, IRGACURE 819, IRGACURE 819DW; manufactured by Ciba Specialty Chemicals); a phosphine oxide-based compound (for example, IRGACURE 2100; manufactured by Ciba Specialty Chemicals); a metallocene-based compound (for example, IRGACURE 784; manufactured by Ciba Specialty Chemicals); or an iodonium salt (for example, IRGACURE 250, manufactured by Ciba Specialty Chemicals), and the like may be used.

In one example, the initiator may be used in an amount of 5 parts by weight or less relative to 100 parts by weight of the total content of the first resin and the second resin. Specifically, the initiator may be used in an amount of 0.001 parts by weight or more, or 0.01 parts by weight or more, and may be used in a range of 3 parts by weight or less, or 2 parts by weight or less. When the initiator is used in the above range, suitable photo-curing can be achieved.

The pressure-sensitive adhesive composition of the present application may comprise an antistatic agent. As the antistatic agent, a known antistatic agent may be used without limitation.

In one example, the pressure-sensitive adhesive composition of the present application may comprise 5 parts by weight or less of an antistatic agent relative to 100 parts by weight of the total content of the first resin and the second resin. Specifically, the antistatic agent may be used in an amount of 5 parts by weight or less, 4 parts by weight or less, 3 parts by weight or less, or 2 parts by weight or less.

The polymerized unit derived from the compound represented by Formula 1, which is contained in the second resin, has excellent affinity with an antistatic agent. In addition, as described above, the second resin having a relatively low molecular weight has excellent dispersibility. Therefore, the second resin having a low molecular weight and the antistatic agent can have a uniform surface distribution in the composition of the present application and/or the cured product thereof, thereby effectively lowering the surface resistance of the pressure-sensitive adhesive layer.

When an excessive amount of an antistatic agent is used to impart antistatic abilities to the pressure-sensitive adhesive layer, contamination due to transfer or deterioration of adhesive force occurs, but the present application comprises the second resin having the above constitution, and thus even if a small content of the antistatic agent is used, it is possible to significantly improve the antistatic effect by reducing the surface resistance. Although not particularly limited, the lower limit of the antistatic agent content may be 0.1 parts by weight or more, 0.2 parts by weight or more, 0.3 parts by weight or more, 0.4 parts by weight or more, or 0.5 parts by weight or more.

In one example, as the antistatic agent, an ionic compound may be used. As the ionic compound, for example, a metal salt or an organic salt may be used.

The metal salt ionic compound may comprise, for example, an alkali metal cation or an alkaline earth metal cation. The cation may be exemplified by one or two or more of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), and the like, and for example, one or two or more of a lithium ion, a sodium ion, a potassium ion, a magnesium ion, a calcium ion and a barium ion may be used, or a lithium ion may be used in consideration of ion stability and mobility.

The anion included in the metal salt may be exemplified by $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) or trispentafluoroethyl trifluorophosphate ($P(C_2F_5)_3F_3^-$), and the like.

In another example, as the anion included in the metal salt, an anion represented by Formula 2 below or bisfluorosulfonylimide, and the like can also be used.

[Formula 2]

In Formula 2, A is a nitrogen atom or a carbon atom, B is a carbon atom or a sulfur atom, $R_f$ is a perfluoroalkyl group, m is 1 or 2, and n is 2 or 3. In Formula 2, when B is carbon, m may be 1; when B is sulfur, m may be 2; when A is nitrogen, n may be 2; and when A is carbon, n may be 3.

The anion of Formula 2 or bis(fluorosulfonyl)imide exhibits high electronegativity due to the perfluoroalkyl group ($R_f$) or the fluorine group, and also contains a unique resonance structure to have hydrophobicity while forming a weak bond with the cation. Accordingly, the ionic compound can exhibit excellent compatibility with other components, such as a polymer, of the composition, as well as give high antistatic property even in a small amount.

$R_f$ in Formula 2 above may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula 2 may be a sulfonylmethide-based, sulfonylimide-based, carbonylmethide-based or carbonylimide-based anion, and specifically, one or more of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanesulfonylimide or bispentafluoroethanecarbonylimide, and the like may be used.

As the organic salt ionic compound, for example, one containing quaternary ammonium such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium, pyridinium, imidazolium, pyrrolidinium or piperidinium, and the like together with the anion component may also be used.

In the present application, the antistatic agent may also comprise the metal salt and the organic salt simultaneously, if necessary.

Besides, the pressure-sensitive adhesive composition for forming the pressure-sensitive adhesive layer may further comprise additives such as an epoxy resin, a curing agent, an ultraviolet stabilizer, an antioxidant, a colorant, a reinforcing agent, a filler, a defoamer, a surfactant or a plasticizer. The specific kind or content of the additive is not particularly limited.

The pressure-sensitive adhesive layer having the above constitution can have a surface resistance value and peel force suitable for use. Specifically, the pressure-sensitive adhesive layer may have a surface resistance value of $1 \times 10^{10} \Omega/\square$ or less and peel force in a range of 300 to 700 gf/inch, as measured at a speed of 300 mm/min and an angle of 900 for a glass base material.

The present application also relates to a display device. When the display device is an LCD, the device may comprise a liquid crystal panel and the pressure-sensitive adhesive polarizing plate attached to one side or both sides of the liquid crystal panel.

The liquid crystal panel may comprise, for example, a first substrate, a pixel electrode, a first alignment film, a liquid crystal layer, a second alignment film, a common electrode and a second substrate, which are sequentially formed. In one example, the first substrate and the second substrate may be glass substrates. In this case, the optical member may be attached to the glass substrate via the pressure-sensitive adhesive layer.

The device may further comprise a light source on the opposite side of the viewing side of the liquid crystal panel. In the first substrate on the light source side, for example, an active driving circuit including a TFT (thin film transistor) as a driving element electrically connected to the transparent pixel electrode and a wiring, and the like may be formed. The pixel electrode comprises, for example, ITO (indium tin oxide) or the like, which can function as an electrode for each pixel. In addition, the first or second alignment film may comprise, for example, a material such as polyimide, but is not limited thereto.

In the device, as the liquid crystal panel, for example, all the known panels of passive matrix type panels such as TN (twisted nematic) type, STN (super twisted nematic) type, F (ferroelectic) type or PD (polymer dispersed) type panels; active matrix type panels such as two terminal type or three terminal type panels; in-plane switching (IPS) panels and vertical alignment (VA) panels, and the like may be applied.

The type of other constitutions of the display device, for example, upper and lower substrates such as a color filter substrate or array substrates in a liquid crystal display device is not particularly limited, and constitutions known in this field can be adopted without limitation.

In another example of the present application, the present application relates to a pressure-sensitive adhesive composition. The specific constitutions of the pressure-sensitive adhesive composition are the same as those described above, and it can be used for a purpose of being attached to one side of a polarizing plate.

Advantageous Effects

According to one example of the present application, a pressure-sensitive adhesive composition, a polarizing plate and a liquid crystal device, which have excellent durability and antistatic abilities, can be provided.

BEST MODE

Hereinafter, the present application will be described in detail through examples and comparative examples. However, the scope of the present application is not limited by the following examples.

Evaluation Items and Evaluation Methods

Weight average molecular weight: The molecular weight and molecular weight distribution (PDI) of a polymer were measured using GPC (gel permeation chromatograph), and GPC measurement conditions were as follows. The calibration curve was prepared using standard polystyrene (manufactured by Aglient system), and the measurement result was converted into the weight average molecular weight (Mw).

<GPC Measurement Conditions>
Measuring instrument: Aglient GPC (Aglient 1200 series, U.S.)
Column: two PL Mixed B connections
Column temperature: 40° C.
Eluent: THF (tetrahydrofuran)
Flow rate: 1.0 mL/min Concentration: ~1 mg/mL (100 µl injection)

Surface resistance: The surface resistance of a pressure-sensitive adhesive layer was measured using a Hiresta-UX surface resistance meter, and measurement conditions were as follows.

<Surface Resistance Measurement Conditions>

Measuring instrument: Hiresta-UX

Applied voltage: 100V

Time: 30 seconds

Environment (temperature/humidity): 25 degrees, 50% RH

High temperature and high humidity durability: A pressure-sensitive adhesive layer was cut to a size of 8×13 cm, attached to soda-lime glass and then placed in a chamber at a 60° C./90% RH condition, and after 500 hours, it was observed whether or not bubbles were generated.

<Evaluation Criteria>

Presence of bubbles observed with naked eyes: NG

Absence of bubbles observed with naked eyes: OK

Light leakage shielding ability: Two optical members including a pressure-sensitive adhesive layer to be produced below and a polarizing plate were laminated on soda-lime glass so as to be orthogonal to each other, and the laminate was maintained in an autoclave under the conditions of 40° C., 4 bar and 20 minutes to produce a test plate. The prepared test plate was allowed to stand at a condition of 80° C. for 500 hours, and the degree of light leakage was visually observed and evaluated according to the following criteria.

<Evaluation Criteria>

Almost no light leakage: good

Slight light leakage: normal

Apparent light leakage: NG

Peel force: The pressure-sensitive adhesive film was cut to a width of 1 inch, attached to soda-lime glass and allowed to stand at room temperature for 1 hour, and then the peel force was measured. At this time, the room temperature is a temperature that no warming or cooling is performed artificially, which is a temperature in a range of 18 to 30° C.

<Measurement Conditions>

Measuring instrument: tensile machine from TA (Texture Analyzer) instrument

Measuring angle: 900

Measuring speed: 300 mm/min

<Evaluation Criteria>

300 to 700 gf/inch: proper

Less than 300 gf/inch: improper

EXAMPLES AND COMPARATIVE EXAMPLES

Example 1

Production of first resin (A): 85 parts by weight of BA (n-butyl acrylate), 5 parts by weight of DMAA (dimethyl acrylamide) and 10 parts by weight of HBA (hydroxybutyl acrylate) were bulk-polymerized at 50° C. and normal pressure to obtain a first resin having a weight average molecular weight of 2,500,000.

Production of second resin (B): 60 parts by weight of BA (n-butyl acrylate) and 40 parts by weight of EOEOEA (2-(2-ethoxyethoxy)ethyl acrylate) were bulk-polymerized to obtain a second resin having a weight average molecular weight of 300,000.

A composition comprising 70 parts by weight of the first resin and 30 parts by weight of the second resin, as prepared above, and 0.3 parts by weight of an initiator (irgacure-819), 1.0 part by weight of a urethane acrylate-based curing agent (Miwon Specialty Chemicals, SUO-1020) and 1.5 parts by weight of an antistatic agent (FC-4400) was coated on a release base material with a comma coater. Then, it was irradiated with light having a wavelength of 368 nm by a Sylvania black light lamp for about 4 minutes to produce a pressure-sensitive adhesive layer. The evaluated properties are as shown in Table 2.

Example 2

A pressure-sensitive adhesive layer was produced in the same manner as in Example 1, except that the content between the resins was changed as in Table 1 below.

Comparative Example 1

A pressure-sensitive adhesive layer was produced in the same manner as in Example 1, except that 100 parts by weight of one resin having the composition shown in Table 1 below was used.

Comparative Example 2

A pressure-sensitive adhesive layer was produced in the same manner as in Example 1, except that 100 parts by weight of one resin having the composition as shown in Table 1 below was used.

Comparative Example 3

A pressure-sensitive adhesive layer was produced in the same manner as in Example 1, except that 100 parts by weight of one resin having the composition as shown in Table 1 below was used.

Comparative Example 4

A pressure-sensitive adhesive layer was produced in the same manner as in Example 1, except that two resins having the compositions as shown in Table 1 below were used.

Comparative Example 5

A pressure-sensitive adhesive layer was produced in the same manner as in Example 1, except that two resins having the compositions as shown in Table 1 below were used.

TABLE 1

|  |  | Example | | Comparative Example | | | | |
|---|---|---|---|---|---|---|---|---|
|  |  | 1 | 2 | 1 | 2 | 3 | 4 | 5 |
| Resin A | BA ratio | 85 | 85 | — | — |  | 85 | 85 |
|  | DMAA ratio | 5 | 5 | — | — |  | 5 | 5 |
|  | HBA ratio | 10 | 10 | — | — |  | 10 | 10 |

TABLE 1-continued

|  |  | Example | | Comparative Example | | | | |
|---|---|---|---|---|---|---|---|---|
|  |  | 1 | 2 | 1 | 2 | 3 | 4 | 5 |
| Resin B | Mw (×10,000) | 250 | 250 | — | — | — | 250 | 250 |
|  | BA ratio | 60 | 60 | — | — | — | 30 | 60 |
|  | EOEOEA ratio | 40 | 40 | — | — | — | 70 | 40 |
|  | Mw (×10,000) | 30 | 30 | — | — | — | 30 | 100 |
| Resin C | BA | — | — | 85 | 65 | 85 | — | — |
|  | DMAA | — | — | 5 | 5 | 5 | — | — |
|  | HBA | — | — | 10 | 10 | 10 | — | — |
|  | EOEOEA | — | — | — | 20 | — | — | — |
|  | Mw (×10,000) | — | — | 250 | 250 | 250 | — | — |
| Curing Agent (SUO-1020) | | 1 | 1 | 1 | 1 | 1 | 1 | 1 |
| Initiator (irgacure-819) | | 0.3 | 0.3 | 0.3 | 0.3 | 0.3 | 0.3 | 0.3 |
| Antistatic Agent (FC-4400) | | 1.5 | 1.5 | 1.5 | 1.5 | 5 | 1.5 | 1.5 |
| Ratio between Resins | | 70:30:0 (A:B:C) | 50:50:0 (A:B:C) | 0:0:100 (A:B:C) | 0:0:100 (A:B:C) | 0:0:100 (A:B:C) | 50:50:0 (A:B:C) | 50:50:0 (A:B:C) |

Ratio between monomers or resins: part by weight
BA: n-butyl acrylate
HBA: 4-hydroxybutyl acrylate
DMAA: dimethyl acrylamide
EOEOEA: 2-(2-ethyoxyethyoxy)ethyl acrylate

TABLE 2

|  | Example | | Comparative Example | | | | |
|---|---|---|---|---|---|---|---|
|  | 1 | 2 | 1 | 2 | 3 | 4 | 5 |
| Surface Resistance (×10¹⁰) (Ω/□) | 0.354 | 0.11 | 9.33 | 4.23 | 0.23 | 0.09 | 0.251 |
| High Temperature/High Humidity Durability | OK | OK | OK | OK | NG | NG | NG |
| Light Leakage Ability | Good | Good | Good | Good | Good | Good | Good |
| Peel Force (gf/inch) | Proper (503 gf/inch) | Proper (429 gf/inch) | Proper (410 gf/inch) | Proper (337 gf/inch) | Improper (153 gf/inch) | Improper (214 gf/inch) | Improper (233 gf/inch) |

In the case of Examples, all of the evaluated physical properties are excellent. On the other hand, in the case of Comparative Examples having no configuration according to the present invention, it can be seen that the measured physical properties are poor.

Specifically, in the case of Comparative Example 3 comprising a relatively excessive amount of the antistatic agent to reduce the surface resistance, high temperature/high humidity durability and adhesive force are poor due to bleeding out of the antistatic agent. In the case of Comparative Example 4 comprising an excessive amount of EOEOEA, the surface resistance is lowered, but the compatibility between resins is lowered and thus high temperature/high humidity durability and adhesive force are poor. In the case of Comparative Example 5 that the second resin have a weight average molecular weight of 1,000,000, it can be seen that the antistatic function by the second resin is not sufficient and both the durability and the adhesive force are not good.

The invention claimed is:

1. A pressure-sensitive adhesive polarizing plate comprising:
   a polarizing film; and
   a pressure-sensitive adhesive layer formed on at least one side of the polarizing film, wherein the pressure-sensitive adhesive layer is a photocured product of a solventless photocurable pressure-sensitive adhesive composition, and
   the solventless photocurable pressure-sensitive adhesive composition comprises:
   40 parts by weight to 95 parts by weight of: a first resin having a weight average molecular weight in a range of 1,000,000 to 3,500,000, and comprising polymerized units derived from a (meth)acrylic acid ester monomer;
   5 parts by weight to 60 parts by weight of: a second resin which is different from the first resin, wherein the second resin has a weight average molecular weight smaller than 1,000,000, and comprises polymerized units derived from 50 parts by weight to 90 parts by weight of a (meth)acrylic acid ester monomer and 10 to 50 parts by weight of a monomer represented by Formula 1 below:

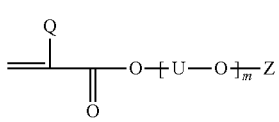

[Formula 1]

wherein, Q is hydrogen or an alkyl group having 1 to 20 carbon atoms, each U is independently an alkylene having 1 to 4 carbon atoms, m is a number of 1 to 15, and Z is hydrogen, an alkyl group having 1 to 20 carbon atoms or an aryl group having 6 to 25 carbon atoms;

a bifunctional urethane acrylate oligomer having two acrylate groups at the terminals thereof, in a content of 0.01 to 5 parts by weight relative to 100 parts by weight of the total content of the first resin and the second resin; and an antistatic agent which is an organic salt, in a content of 0.5 to 5 parts by weight relative to 100 parts by weight of the total of the first resin and the second resin, having a uniform surface distribution in the composition.

2. The pressure-sensitive adhesive polarizing plate according to claim 1, wherein Z is hydrogen or an alkyl group having 1 to 20 carbon atoms.

3. The pressure-sensitive adhesive polarizing plate according to claim 1, when the first resin further comprises polymerized units derived from a compound capable of hydrogen bonding.

4. The pressure-sensitive adhesive polarizing plate according to claim 3, wherein the compound capable of hydrogen bonding has a hydroxyl group, a carboxyl group, a urethane group, an amine group or an amide group.

5. The pressure-sensitive adhesive polarizing plate according to claim 4, wherein the first resin comprises 30 parts by weight or less of polymerized units derived from the compound capable of hydrogen bonding.

6. The pressure-sensitive adhesive polarizing plate according to claim 1, wherein the solventless photocurable pressure-sensitive adhesive composition further comprises a multifunctional (meth)acrylate and a photoinitiator.

7. The pressure-sensitive adhesive polarizing plate according to claim 6, wherein in the solventless photocurable pressure-sensitive adhesive composition, the multifunctional (meth)acrylate is present in an amount of 5 parts by weight or less relative to 100 parts by weight of the total amount of the first resin and the second resin.

8. The pressure-sensitive adhesive polarizing plate according to claim 6, wherein in the solventless photocurable pressure-sensitive adhesive composition, the photoinitiator is present in an amount of 5 parts by weight or less relative to 100 parts by weight of the total amount of the first resin and the second resin.

9. The pressure-sensitive adhesive polarizing plate according to claim 1, wherein the pressure-sensitive adhesive layer has a surface resistance of $1\times10^{10}$ Ω/sq, and peel force in a range of 300 to 700 gf/inch, as measured at a speed of 300 mm/min and an angle of 90° when peeled from a glass base material.

10. A display device comprising a liquid crystal panel that the pressure-sensitive adhesive polarizing plate according to claim 1 is attached to one side or both sides thereof.

11. The display device according to claim 10, wherein the liquid crystal panel comprises a first substrate, a pixel electrode, a first alignment film, a liquid crystal layer, a second alignment film, a common electrode and a second substrate.

12. The pressure-sensitive adhesive polarizing plate according to claim 1, wherein the polarizing film comprised a polyvinyl alcohol-based resin having a gelation degree of about 85 mol % to about 100 mol %, and a polymerization degree of about 1,000 to about 10,000.

13. A solventless photocurable pressure-sensitive adhesive composition comprising:

40 parts by weight to 95 parts by weight of: a first resin having a weight average molecular weight in a range of 1,000,000 to 3,500,000, and comprising Polymerized units derived from a (meth)acrylic acid ester monomer;

5 parts by weight to 60 parts by weight of: a second resin which is different from the first resin, wherein the second resin has a weight average molecular weight smaller than 1,000,000, and comprises polymerized units of 50 parts by weight to 90 parts by weight of a (meth)acrylic acid ester monomer and polymerized units of 10 to 50 parts by weight of a monomer represented by Formula 1 below:

[Formula 1]

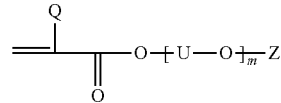

wherein, Q is hydrogen or an alkyl group having 1 to 20 carbon atoms, each U is independently an alkylene having 1 to 4 carbon atoms, m is a number in a range of 1 to 15, and Z is hydrogen, an alkyl group having 1 to 20 carbon atoms or an aryl group having 6 to 25 carbon atoms;

a bifunctional urethane acrylate oligomer having two acrylate groups at the terminals thereof, in a content of 0.01 to 5 parts by weight relative to 100 parts by weight of the total content of the first resin and the second resin; and an antistatic agent which is an organic salt, in a content of 0.5 to 5 parts by weight relative to 100 parts by weight of the total of the first resin and the second resin, having a uniform surface distribution in the composition.

14. The solventless photocurable pressure-sensitive adhesive composition according to claim 13, wherein Z is hydrogen or an alkyl group having 1 to 20 carbon atoms.

15. The solventless photocurable pressure-sensitive adhesive composition according to claim 13, wherein the composition further comprises a multifunctional (meth)acrylate and a photoinitiator.

* * * * *